(12) United States Patent
Murray

(10) Patent No.: US 7,984,436 B1
(45) Date of Patent: Jul. 19, 2011

(54) MANAGEMENT OF COMPATIBILITY OF SOFTWARE PRODUCTS INSTALLED ON A USER'S COMPUTING DEVICE

(75) Inventor: Calum Murray, Santa Rosa, CA (US)

(73) Assignee: Intuit Inc., Mountain View, CA (US)

( * ) Notice: Subject to any disclaimer, the term of this patent is extended or adjusted under 35 U.S.C. 154(b) by 1300 days.

(21) Appl. No.: 11/236,942

(22) Filed: Sep. 27, 2005

(51) Int. Cl.
*G06F 9/44* (2006.01)

(52) U.S. Cl. .................. 717/175; 717/121; 717/176

(58) Field of Classification Search .................. None
See application file for complete search history.

(56) References Cited

U.S. PATENT DOCUMENTS

| | | | |
|---|---|---|---|
| 6,237,144 B1 * | 5/2001 | Delo | 717/174 |
| 6,467,088 B1 * | 10/2002 | alSafadi et al. | 717/173 |
| 6,681,391 B1 * | 1/2004 | Marino et al. | 717/175 |
| 6,735,757 B1 * | 5/2004 | Kroening et al. | 717/120 |
| 7,594,219 B2 * | 9/2009 | Ramachandran et al. | 717/124 |
| 2005/0022176 A1 * | 1/2005 | Ramachandran et al. | 717/170 |
| 2005/0066325 A1 * | 3/2005 | Mori et al. | 717/174 |

* cited by examiner

*Primary Examiner* — Michael J Yigdall
(74) *Attorney, Agent, or Firm* — Park, Vaughan, Fleming & Dowler LLP

(57) ABSTRACT

Physical components that share common attributes in a software product are combined into logical groupings. A product matrix also lists logical groupings that are included into each software product listed in the product matrix. A compatibility matrix indicates whether any two logical groupings listed in the product matrix are compatible. When a new product is provided for an installation, the compatibility matrix is consulted to determine whether any two logical groupings of the new product and installed product are compatible. An installation can proceed or be terminated based on the compatibility determination.

16 Claims, 7 Drawing Sheets

| Product<br>Logical Grouping | Product A, v. 11.0 | Product A, v. 12.0 | Product B, v. 1.0 | Product C |
|---|---|---|---|---|
| Schema 1.0 | x | | | |
| Schema 1.1 | | x | x | x |
| Data Layer 1.0 | x | | | |
| Data Layer 1.1 | | x | x | x |
| Invoicing 1.0 | x | x | | |
| Payroll 1.0 | x | x | | x |
| Payroll 1.1 | | | | |

Product Matrix 200

FIG. 2

| | Schema 1.0 | Schema 1.1 | Data Layer 1.0 | Data Layer 1.1 | Invoicing 1.0 | Payroll 1.0 |
|---|---|---|---|---|---|---|
| Schema 1.0 | D | | | | | |
| Data Layer 1.0 | C | C | | | | |
| Data Layer 1.1 | U | C | U | | | |
| Invoicing 1.0 | D | D | C | U | | |
| Payroll 1.0 | D | D | C | U | C | |
| Payroll 1.1 | D | D | C | C | C | D |

| Product<br>Logical Grouping | Product A, v. 11.0 | Product B, v. 1.0 |
|---|---|---|
| Schema 1.0 | X | |
| Schema 1.1 | | X |
| Data Layer 1.0 | X | |
| Data Layer 1.1 | | X |
| Invoicing 1.0 | X | |
| Payroll 1.0 | X | |
| Payroll 1.1 | | |
| ... | | |

Matrix of Installed Products 430

FIG. 5

MANAGEMENT OF COMPATIBILITY OF SOFTWARE PRODUCTS INSTALLED ON A USER'S COMPUTING DEVICE

BACKGROUND

The present invention relates generally to managing multiple software products or versions of products installed on a user's computing device.

Managing multiple products and/or versions of software products that use shared software components in different development and release cycles can present a challenge when multiple products are installed on a user's computing device. A newly installed product that uses a shared component or resource can overwrite that shared component/resource with a newer version, thereby affecting installed products. Accordingly, maintaining compatibility between software products on a user's computing device and ensuring that an installation activity does not affect existing components is important.

A known solution to this problem is using a product matrix that lists on a horizontal axis all products that have common physical components and on a vertical axis physical components that make up a product. A physical software component is a cohesive piece of software that offers a cohesive set of services. Examples of physical software components are executable files, data storage, libraries, and/or a combination thereof. The product matrix indicates which physical components are included into each product. Such a matrix usually requires thousands of entries due to a large number of the physical components. In addition, a compatibility matrix is created that lists compatibility between any two physical components for all the products listed in the product matrix. When installing a new product, the matrix is traversed to determine whether the new product and the installed products have any two physical components that are not compatible. As most software products contain dozens, sometime hundreds of components, adding a new product to a user's computer increase the number of physical components that need to be analyzed in order to determine compatibility between any two products.

SUMMARY

In various embodiments, the present invention provides methods, systems, and a computer program product for determining compatibility between software products installed on a system and software products provided for an installation. In one aspect of the invention, physical components in a software product are combined into logical groupings based on a common attribute. A common attribute can be a common function performed by physical components, the same development cycle, or a released content. A version is assigned to a logical grouping. A product matrix is created that lists a number of different products, as well as logical groupings that are included into each product. A compatibility matrix is created that indicates whether any two logical groupings listed in the product matrix are compatible. When a new product is provided to a system for an installation thereon, the compatibility matrix is consulted to determine whether at least one logical grouping of the new product is incompatible with at least one logical grouping of the installed products already existing on the system. An installation can proceed, be suspended, or cancelled, depending on the compatibility determination. Combining physical components into logical groupings based on common attributes reduces the number of the physical components that need to be analyzed in order to determine compatibility between any two software products.

According to one embodiment in which the present invention may be used, a user intends to install a software product on the user's computing device. A product may be stored on a server system, and the user needs to access the server system to install the product. Alternatively, the product resides on a removable storage medium, such as DVD or CD-ROM. The product is stored along with a product matrix that lists products and logical groupings included into each product. The product is also provided with an installation module. The user's computing device may already store a product matrix, a matrix of installed products, and a compatibility and dependability matrix (DCM). These matrices may have been provided during a previous installation process.

When a user starts the installation process, the installation module is loaded into a memory of the user's computing device. The installation module determines whether any of the products listed in the product matrix that is provided with the new product are already installed on the user computing device. If at least one of the products listed in the product matrix is already installed, the installation module invokes a physical configuration module (PCM). In an alternative embodiment, various operations performed by the installation module can be executed by the PCM module. The PCM determines whether the product matrix provided with a new product is more up-to-date than the product matrix stored on the user's computing device and provides the up-to-date product matrix to a version management module. The version management module traverses the DCM to determine whether any logical grouping included in a new product is incompatible with any logical grouping included in the installed products. The version management module provides compatibility results to the PCM, which in turn, passes the results to the installation module. The installation module performs an action in response to the determination. The installation module, for example, may proceed with an installation of the product or may indicate that a user intervention is needed.

One skilled in the art will readily recognize from the following discussion that alternative embodiments of the structures and methods illustrated herein may be employed without departing from the principles of the invention described herein.

BRIEF DESCRIPTION OF THE DRAWINGS

FIG. 2 is an exemplary product matrix that describes packages that make up software products according to one embodiment of the present invention.

FIG. 3 is an exemplary dependency and compatibility matrix that provides cross-compatibility between various software products according to one embodiment of the present invention.

FIG. 5 is an exemplary matrix of installed products that lists all the products installed on a client device.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
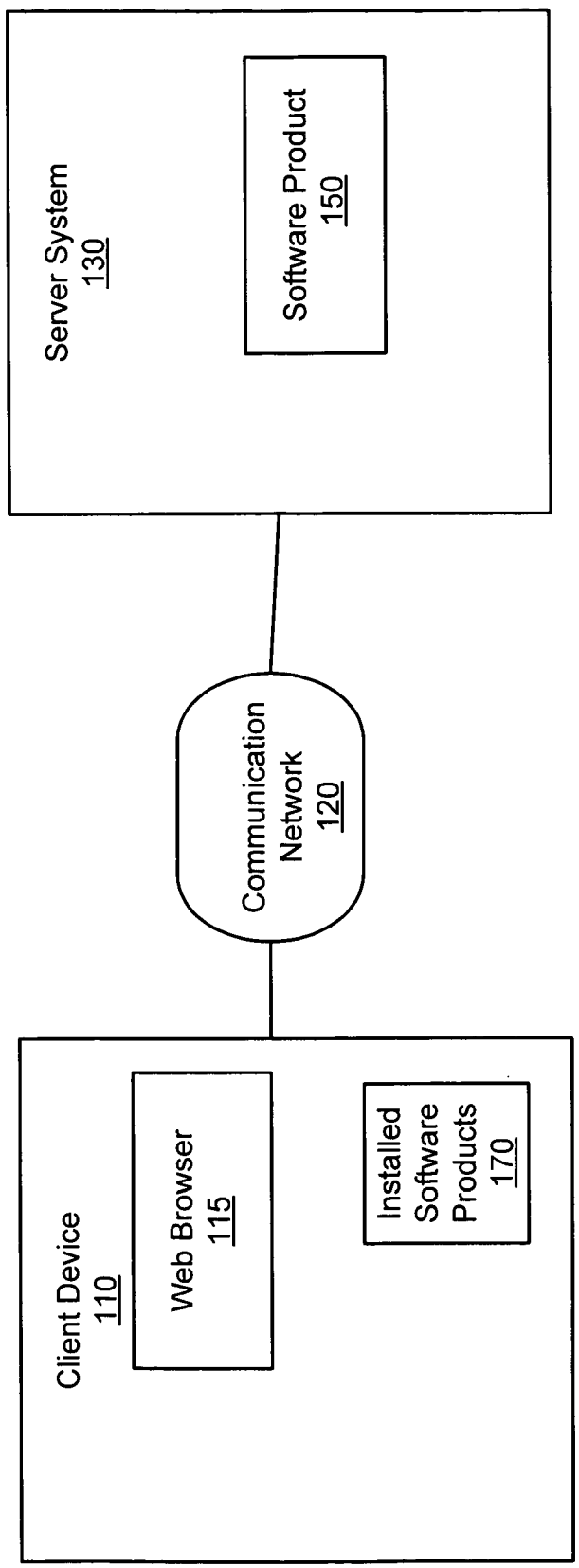
FIG. 1 is a block diagram of environment in which one embodiment of the invention operates.

FIG. 1 is a block diagram of the environment in which one embodiment of the present invention operates. Environment 100 includes a client device 110 associated with a user (not shown) and connected to a server system 130 by a communication network 120.

As used herein, the term "server system" 130 simply denotes those aspects of a collection of software programs associated with a remote computer system, as well as underlying operating system and hardware support that provides an online product service to the client devices 110. The client device 110 is of conventional design, and includes a processor, an addressable memory, and other conventional features (not illustrated) such as a display, local memory, input/output ports, and a network interface. In other embodiments one or more of the components of the client device 110 may be located remotely and accessed via a network, e.g., 120. The network interface and a network communication protocol provide access to a network 120 and other computers, along with access to the Internet, via a TCP/IP type connection, or to other network embodiments, such as a LAN, a WAN, a MAN, a wired or wireless network, a private network, a virtual private network, or other networks. In various embodiments the client device 110 may be implemented on a computer running a Microsoft operating system, Mac OS, various flavors of Linux, UNIX, Palm OS, and/or other operating systems.

Client device 110 executes a web browser 115 for interpreting HTML or other display instructions in the web page and displaying the content accordingly. Web browser 115 includes additional functionality, such as a Java Virtual Machine, for executing JAVA® applets, ActiveX®, Flash®, and/or other applets or scripts technologies as available now or in the future.

Client device 110 executes various software products 170 that have been previously installed. In one embodiment, the client device 110 executes financial management products (e.g., accounting, checkbook, trading, portfolio manager, etc.), just name a few of the many different possible hosted product types.

Figure 4:
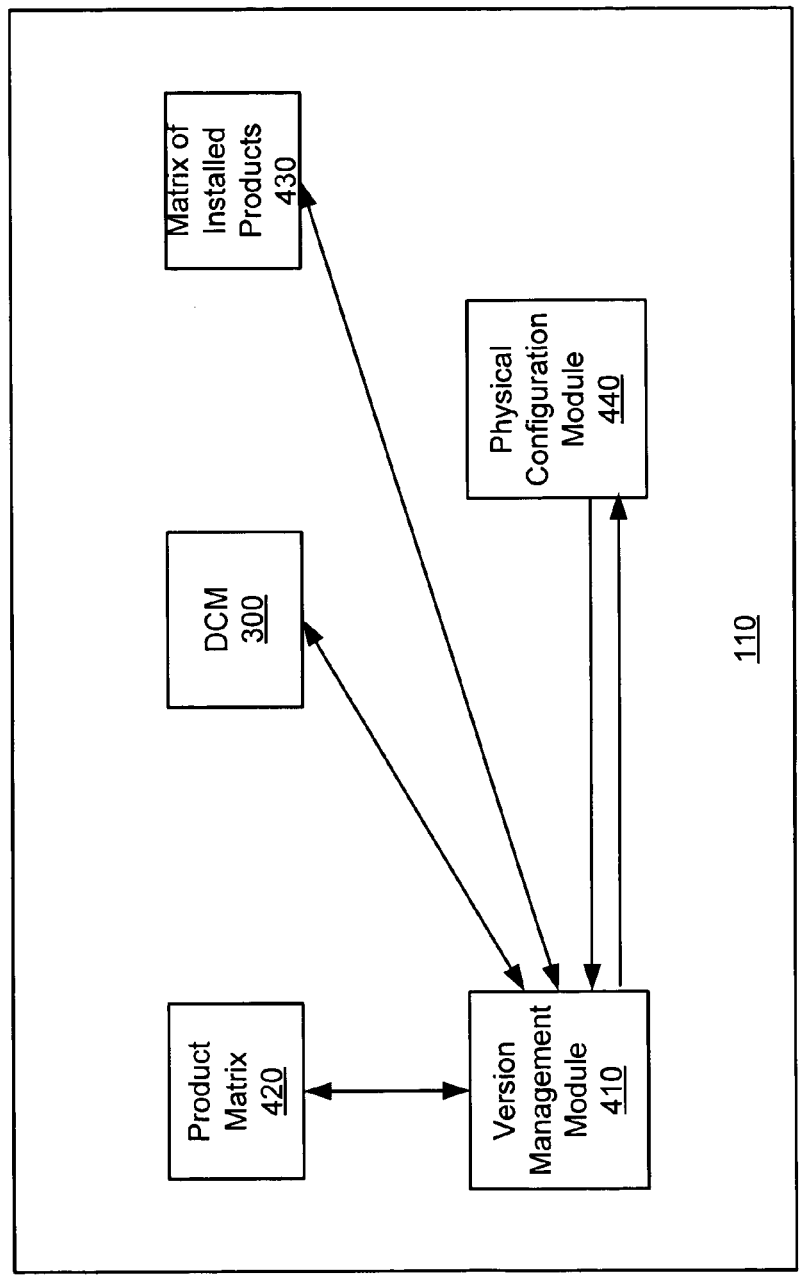
FIG. 4 is a block diagram illustrating the architecture of one embodiment of a system performing functionality of the present invention.

Client device 110 also executes various modules adapted to perform functionalities of the present invention. These modules are a version management module 410 and a physical configuration module 440. These modules are shown in FIG. 4 and described in more detail in reference to FIG. 4.

Communication network 120 can be the Internet, and particularly, the World Wide Web portion thereof. However, it will also be appreciated that communication network 120 can be a LAN, WAN, intranet of any size, or any other communication mechanism that is capable of supporting communication between a client device 110 and a server system 130. A user (not shown) accesses server system 130 to install a software product 150 stored on server system 130 using a client device 110. The installation process involves actual transferring of the physical components that are included in a software product 150 from server system 130 to client device 110 over communication network, e.g., 120. A physical component is a cohesive piece of a software product that offers a cohesive set of services. Examples of the physical components are executable modules, data structures, DLLs, and a combination thereof. In another embodiment, software product 150 may be provided to client device 110 on a computer readable media, such as a CD-ROM, diskette, or by electronic communication over the communication network 120 from one of the third party computers (not shown) or other distributors of software, for installation and execution thereon.

As was previously described, when multiple software products 170 are installed a client device 110, installing a new software product 150 can present a challenge since some of the physical components included in the previously installed software products 170 may not be compatible with the physical components of the new software product 150 that is about to be installed. Embodiments of the present invention overcome limitations of a known method for determining compatibility between products by grouping physical components that share common attributes into logical groupings. As a result, the number of the physical components that need to be analyzed in order to determine compatibility between any two products is significantly reduced.

Figure 7:
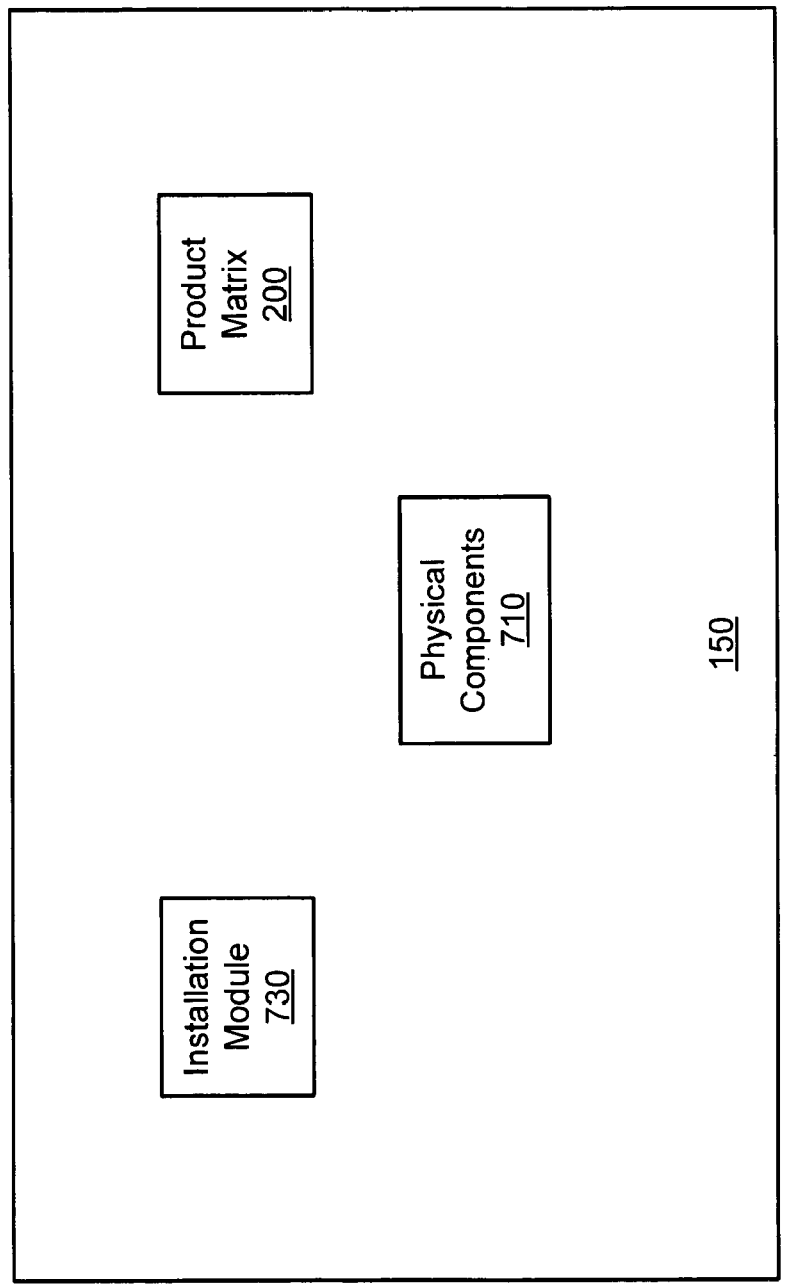
FIG. 7 is a block diagram of the components of a software product provided for installation on a user's computing device.

Referring now to FIG. 7, software product 150 that a user is about to install is shown. Software product 150 includes physical components 710, an installation module 730, and a product matrix 200. The software product 150 is identified by a name and a version identifier (e.g., QuickBooks 1.1) and represents a computer program.

According to an embodiment of the present invention, physical components 710 that share common attributes are combined into logical groupings. A version is assigned to each logical grouping. In one embodiment, a common attribute is a common function performed by a physical component. For example, physical components that represent a data layer of a software product 150 can be logically grouped together. The data layer is the set of code/classes that handles access and storage of the data for the application. Similarly, physical components that carry out business logic in the software product 150 are logically grouped together. Physical components of the platform of a software product 150 can be logically grouped. A platform describes a framework, either in hardware or software, which allows software modules to run. A typical platform includes a computer's architecture, operating system, programming languages, and their runtime libraries. Physical components that represent a feature set can be logically combined. Examples of feature sets in an accounting software product are payroll, inventory, and accounts receivable. In a word processing product example feature sets would include printing, page layout, paragraph formatting, grammar and spell checking, and the like. Feature sets may also be organized by market segments for the product (e.g., retail, construction, healthcare, financial, legal), user types (e.g., novice, intermediate, professional), geographic markets (e.g., United States, Japan, Europe), implementation environment (e.g., single machine or multiple machines over a network), number of users (e.g., single user or multiple user product), or the like. Thus, the particular combinations of physical components that represent a feature set are dependent on the foregoing considerations, as well as on the type and structure of the application, and the organization of its code, and those of skill in the art can readily determine based on the design, purchase, and architecture of their products, which features are associated with which physical components.

In another embodiment, a common attribute can be a development cycle. In yet another embodiment, a common attribute is a released content. An example of the released content are embedded HTML pages that represent HTML files. A person of ordinary skill in the art would understand that physical components can be logically grouped based on any criteria at any level of abstraction.

The product matrix 200 is example of a means for identifying a number of products and the logical groupings of physical components included into each product. The products included in the matrix 200 may be those of a single software product provider, or a number of different providers. FIG. 2 is a block diagram illustrates an example product matrix 200; those of skill in the art will appreciate that such a product matrix will be stored in computer readable form (e.g., a table or array) and need not have any visual representation. Product matrix 200 lists products on a horizontal axis. A product in product matrix 200 is identified by a name and version identifier, (e.g., "Product A, v. 11.0", "Product A, v. 12.0", "Product B, v. 1.0", and "Product C"). Logical groupings are listed on a vertical axis. A logical grouping can be identified by a name and version identifier. Each column in product matrix 200 represents a product; each row represents a logical grouping.

In the product matrix 200, the products (Product A, v. 11.0, Product A, v. 12.0, Product B, v. 1.0, and Product C) are listed across a horizontal axis. Product A, v. 11.0 includes the following logical groupings: "Schema 1.0", "DataLayer 1.0", "Invoicing 1.0", and "Payroll 1.0." In product matrix 200, when a logical grouping is included in a product, "X" is placed at the intersection of a column that lists the product and a row that lists the logical grouping. Of course, other codes can be used to indicate that a logical grouping is included in the product. In product matrix 200, Schema 1.0 represents a logical grouping of data tables and data structures in a database. Invoicing 1.0, for example, represents a logical grouping of physical components that encapsulate business logic for generating invoices. DataLayer 1.0 represents a logical grouping of files that define an interface with persistent memory storage.

Product matrix 200 is periodically updated when a new software product 150 is being released to users or when a patch takes place. A patch is a set of changes provided to an installed software product 170 that alters functionality of a product in some way. When a patch is provided, a new column (e.g., set of associations between the product and the logical groupings) is created in product matrix 200 that reflects that a new version of the product is created. A patch to an installed product may result in altering one or more logical groupings in the installed product 170. For example, Product A, v. 10 is installed on client device 110 and it includes the following logical groupings: Schema 1.0, DataLayer 1.0, and Invoicing 1.0. If a patch is provided to Product A, v. 10, DataLayer 1.0 will be replaced with a new logical grouping that will be assigned a successive version, DataLayer 1.1. This will result in creating a new version of Product A, v. 10, Product A, v. 10.1. Since Product A, v. 10 and Product A, v. 10.1 have different components, their compatibility needs to be assessed.

Product matrix 200 is generated as part of the product development process, but may be generated afterwards as well. The product matrix 200 may be generated programmatically or manually.

System Architecture

FIG. 4 is a block diagram illustrating one embodiment of the components executed on client device 110 for determining compatibility between installed software products and software products provided for an installation. Client device 110 executes the version management module 410 and the physical configuration module (PCM) 440. The term "module" refers to a computer program code and/or hardware adapted to provide the functionality attributed to the module, and which may have any type of implementation, for example, a library file, script, object code, class, package, applet, and so forth. According to one embodiment of the present invention, product matrix 420 and dependability and compatibility matrix (DCM) 300 are also stored on client device 110. These matrices may have been provided to client device 110 during a previous installation process. Matrix 430 of the installed products may have been created if at least one software product is installed on client device 110.

Product matrix 420 has a similar structure to product matrix 200. According to an embodiment of the present invention, product matrix 200 that is provided with software product 150 can be more up-to-date than product matrix 420 stored on client device 110. This happens, for example, when a new product was released to users or a patch has been made. To ensure that product matrix 420 stored on client device 110 is always up-to-date, product matrix 200 is provided during an installation process. If the product matrix 200 is more up-to-date than the stored matrix 420, product matrix 200 is stored on client device 110.

Matrix 430 of installed products is one example of a means for identifying all the software products 170 that are installed on client device 110 as well as logical groupings of physical components that are included in each product 170. Matrix 430 of installed products is periodically updated when a new product, such as software product 150, is being installed on client device 110. An illustration of a sample installed product matrix is shown in FIG. 5. In this matrix 430, products (Product A, v. 11.0 and Product B) are listed across the horizontal axis. The logical groupings are listed vertically. For example, Product A, v. 11.0 includes the following logical groupings: Schema 1.0, DataLayer 1.0, Invoicing 1.0, and Payroll 1.0. Those of skill in the art will appreciate that such a product matrix 430 will be stored in computer readable form (e.g., a table or array) and need not have any visual representation.

The DCM 300 is one example of a means for determining compatibility between any two logical groupings included in the products listed in product matrix 200. Referring now to FIG. 3, an illustration of a sample DCM 300 is shown. The DCM 300 comprises a two-dimensional matrix that lists on both axes of the matrix all logical groupings that are included in products listed in product matrix 200. In the illustrated example of DCM 300, "C" indicates that any two logical groupings are compatible; "U" indicates that any two logical groupings are not compatible; and "D" indicates that the compatibility determination is not important. For example, as shown in FIG. 3, Schema 1.0 is not compatible with DataLayer 1.1. In contrast, DataLayer 1.1 and Schema 1.1 are compatible. Of course, other codes can be used to indicate compatibility status. Those of skill in the art will appreciate that the DCM 300 can be stored as a graph.

Since the DCM 300 according to an embodiment of the present invention identifies compatibility between any two logical groupings, which in turn, comprise of any number of physical components, the DCM 300 reduces the number of the physical components that need to be analyzed in order to determine compatibility between any two products. DCM 300 is generated as part of the product development process, or may be generated afterward. The DCM 300 may be generated programmatically or manually.

Referring again to FIG. 4, PCM 440 is one example of a means for determining a most up-to-date product matrix. The PCM 440 receives product matrix 200 provided with new software product 150, determines whether product matrix 200 is more up-to-date than product matrix 420 stored on client device 110, and provides the most up-to-date product matrix along with DCM 300 to version management module 410.

Version management module 410 is one example of a means for determining whether the new software product 150 is compatible with previously installed software products 170. The version management module receives the most up-to-date product matrix as well as the name of the software product 150 and a version identifier for the software product 150. Version management module 410 uses logical groupings listed in the matrix 430 of installed products and the most up-to-date matrix 200 to traverse the DCM 300 to determine whether the new software product 150 and installed software products 170 are compatible.

Installation module 730 is one example of a means for managing the installation of software product 150 in response to the compatibility determination by version management module 410. Installation module 730 (shown in FIG. 7) is loaded into a memory of client device 110. Installation module 730 is adapted to pass control to the PCM 440 and version management module 410, to receive compatibility results from PCM 440, and to perform an action in response to compatibility determination. Installation module 730 may proceed with an installation, halt the installation process, or require the user's intervention. Installation module 730 also updates the matrix 430 of installed products with the software product 150 upon installation.

Example Methods of Operation

Figure 6:
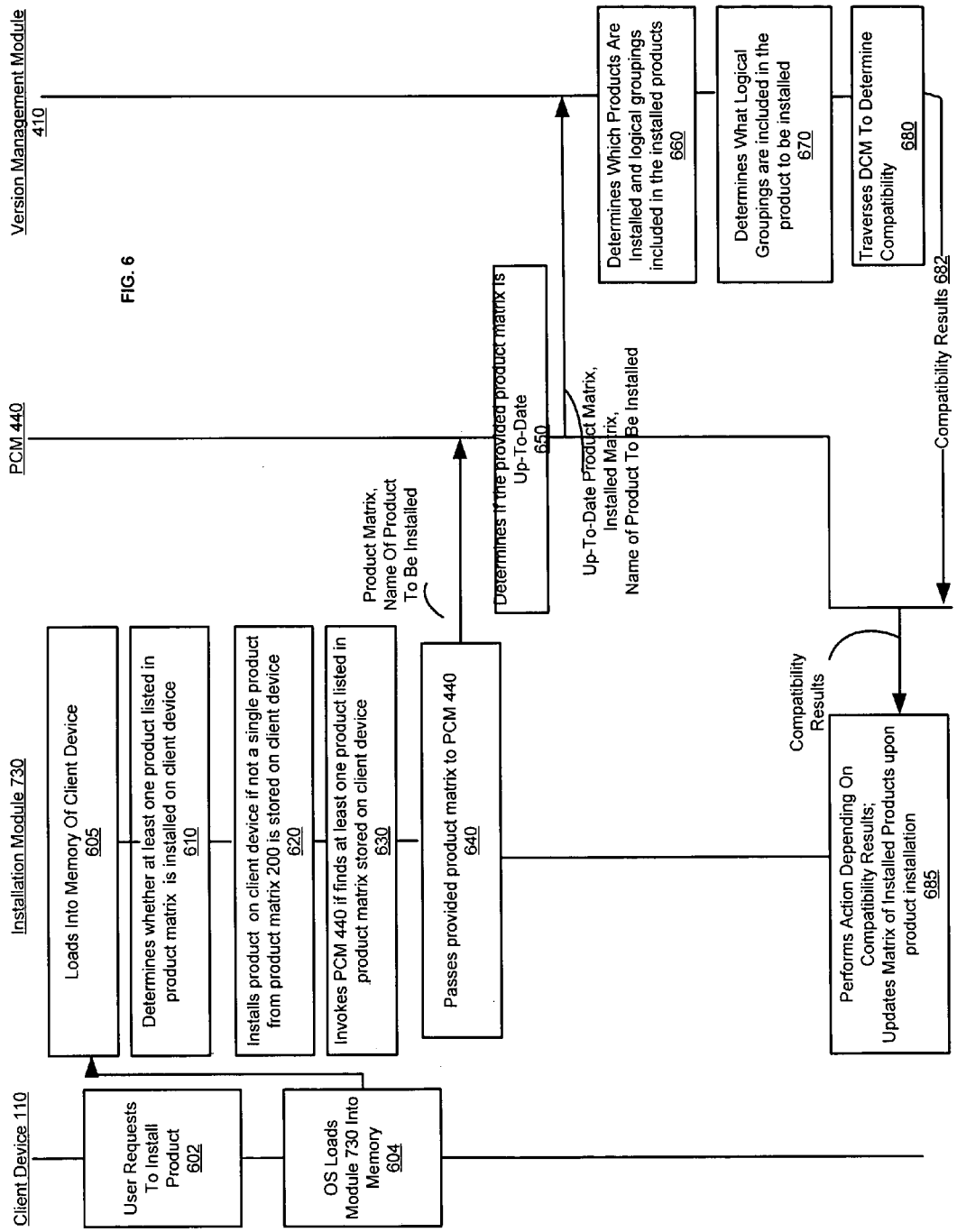
FIG. 6 is an event diagram of the steps performed by an embodiment of the present invention.

FIG. 6 is an event diagram illustrating exemplary transactions performed by client device 110, installation module 730, PCM 440, and version management module 410 to determine whether software product 150 is compatible with software products 170 installed on client device 110. In FIG. 6, these entities are listed across the top. Beneath each entity is a vertical line representing the passage of time. The horizontal arrows between the vertical lines represent communication between the associated entities. It should be noted that not every communication between the entities is shown in FIG. 6. In other embodiments of the present invention, the order of the communication can vary.

Initially, a user makes a request 602 to install software product 150. As was previously described, in one embodiment, user accesses server system 130 to install software product 150. In another embodiment, software product 150 provided on a storage medium, such as a floppy disk, CD-ROM, DVD, or other magnetic, optical, or semiconductor memory.

The operating system of client device 110 loads 604 installation module 730 into the memory of client device 110 and executes the installation module 730 that is provided with software product 150. Installation module 730 executes logic to determine 610 whether any product that is listed in product matrix 200 is installed on client device 110. To this end, in one implementation, installation module 730 checks the product ID. Each product has a unique product IDs that is stored in the operating system registry. Installation module 730 checks the operating system registry for product IDs. If none of the products listed in the product matrix 200 is installed on client device 110, installation module 730 executes logic to install 620 the software product 150 on client device 110. For example, installation module 730 registers various DLL files in the system registry on client device 110. Installation module 730 also copies physical components 710 of software product 150 to the client device 110. Installation module 730 may install PCM 440 and version management module 410 onto the client device 110. In an alternative embodiment, various operations performed by installation module 730 can be executed by the PCM 440.

If at least one product listed in product matrix 200 is installed on client device 110, installation module 730 invokes 630 PCM 440. Installation module 730 also provides to PCM 440 product matrix 200.

PCM 440 reads product matrix 200 and determines 650 whether product matrix 200 is up-to-date. In one embodiment, PCM 440 checks the version of product matrix 420 that is currently stored on client device 110 against the version of the product matrix 200 that is currently being provided to determine which product matrix has the latest version. In another embodiment, PCM 440 uses a date and time mechanism to determine which matrix is the most up-to-date.

If the provided product matrix 200 is the most up-to-date, PCM 440 replaces the stored product matrix 410 with product matrix 200 and provides product matrix 200 to version management module 410. Alternatively, if the installed product matrix 420 is the most up-to-date, PCM 440 provides product matrix 420 to version management module 410. In addition, PCM 440 passes to version management module 410 matrix 430 of installed products and ID of the software product 150 provided for installation.

Version management module 410 reads matrix 430 of installed products, DCM 300, the up-to-date product matrix (either product matrix 200 or product matrix 420), and ID of software product 150. Version management module 410 executes logic to determine whether software product 150 is compatible with the products installed on client device 110. In one embodiment, version management module 410 uses the matrix 430 of installed products to determine 660 which products are installed and which logical groupings are included in the installed software products 170. Version management module 410 uses the up-to-date product matrix to determine 670 which logical groupings are included in software product 150. Version management module 410 uses data from matrix 430 of installed products and up-to-date product matrix to traverse 680 DCM 300 to determine whether software product 150 and installed software products 170 have any two logical groupings that are not compatible. In one embodiment, version management module 410 traverses DCM 300 using a graph-based algorithm, such as for example, a breadth-first search, depth-first search or any other graph based algorithm available now or in the future. As a result, version management module 410 identifies those logical groupings that are not compatible with each other.

Version management module 410 provides 682 compatibility results to PCM 440, which in turn, passes the results to installation module 730. Installation module 730 performs an action 685 in response to the compatibility results.

If version management module 410 did not find that any two components of the software product 150 and installed product 170 are incompatible, installation module 730 proceeds with the installation of software product 150. Installation module 730 updates matrix 430 of installed products with the newly installed software product 150. This has the effect of allowing subsequent installation of other products to again be evaluated to determine whether they are compatible with the set of installed products.

Alternatively, if any of the two logical groupings of the installed software products 170 and software product 150 are non-compatible, installation module 730 may generate a message indicating that an alternative version of some of the components should be used. Installation module 730 may generate a message to a user indicating that a user interaction is required. In this situation, the installation is suspended until the user resolves the problem. Alternatively, the user may wish to abort the installation and not install the new product. In another embodiment, the user may be asked whether he would like to upgrade already installed components to fix the problem. In yet another embodiment, a background download or a patch may take place to attempt to fix the problem.

The present invention has been described with reference to several embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, product specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for enabling determination of whether a first software product is compatible with a second software product, wherein each software product includes a plurality of physical components, the method comprising:
   combining, by computer, physical components of the first software product into a first logical grouping based on a first common attribute, wherein the first logical grouping corresponds to an intermediate abstraction level between a level corresponding to a physical component and a level corresponding to a software product;
   combining physical components of the second software product into a second logical grouping based on a second common attribute;
   in response to determining that the second logical grouping is not compatible with the first logical grouping based on a corresponding entry of a compatibility matrix, identifying an alternate version of the second logical grouping that is compatible with the first logical grouping; and
   returning information about the alternate version of the second logical grouping to enable an installation action to be performed for the alternate version of the second logical grouping.

2. The method of claim 1, wherein the physical components comprise at least one of executable modules, content, data files, and libraries.

3. The method of claim 1, wherein the common attribute comprises at least one of a common function performed by a physical component, the same development cycle, and a released content.

4. A method for determining whether a first software product is compatible with a second software product, wherein each software product includes a plurality of physical components, and the plurality of components may be grouped into logical groupings, the method comprising:
   receiving in a computing device a computer readable medium containing:
      physical components of the first software product combined into a first logical grouping based on a first common attribute, wherein the first logical grouping corresponds to an intermediate abstraction level between a level corresponding to a physical component and a level corresponding to a software product, physical components of the second software product combined into a second logical grouping based on a second common attribute, and a compatibility matrix indicating whether the first logical grouping is compatible with the second logical grouping;

determining whether the first product is installed on the computing device;

in response to determining that the second logical grouping is not compatible with the first logical grouping based on a corresponding entry of the compatibility matrix, identifying an alternate version of the second logical grouping that is compatible with the first logical grouping; and returning information about the alternate version of the second logical grouping to enable an installation action to be performed for the alternate version of the second logical grouping.

5. The method of claim 4, further comprising responsive to the determination that the second logical grouping is compatible with the first logical grouping of the second product, installing the first software product on the same computing device that stores the second product.

6. The method of claim 4, wherein the physical components comprise at least one of executable modules, content, data files, and libraries.

7. The method of claim 4, further comprising:

responsive to the determination that the first logical grouping of the first software product is incompatible with the second logical grouping of the second software product, suspending the installation of the first software product and the second software product on the same computing device.

8. The method of claim 4, further comprising:

identifying logical components included into the first product;

identifying logical component included into the second product; and using the logical components of the first product and the logical components of the second product to traverse the compatibility matrix to determine whether any two logical groupings that are included in the first product and in the second product are compatible.

9. A system for determining whether a software product provided for an installation on a client device is compatible with an installed software product that is installed on the client device, the product provided for an installation and the installed product include a plurality of physical components, the system comprising:

a processing mechanism configured to:

electronically generate a product matrix, which includes a plurality of software products and logical groupings included into each software product, wherein a respective logical grouping includes a plurality of physical components combined together based on a common attribute, and wherein the logical grouping corresponds to an intermediate abstraction level between a level corresponding to a physical component and a level corresponding to a software product;

electronically generate a matrix of installed products, which includes at least one software product installed on the client device and logical groupings included into the at least one software product;

electronically determine whether the product matrix is the most up-to-date product matrix and electronically provide the most up-to-date matrix and the matrix of installed products to a version management module;

electronically determine which products are installed on the client device;

electronically determine which logical groupings are included in each installed product;

electronically determine which logical groupings are included in the product provided for an installation;

electronically determine whether any of the logical groupings included in the product provided for the installation are incompatible with any of the logical groupings of the installed software product;

in response to electronically determining that a second logical grouping included in the product provided for the installation is incompatible with a first logical grouping of the installed software product, electronically determine if alternate versions of the second logical grouping included in the product provided for the installation are compatible with the first logical grouping of the installed software product; and electronically generate compatibility results for the product provided for installation and the installed software product to allow an installation action to be performed.

10. A system for determining whether a software product provided for an installation on a client device is compatible with an installed software product that is installed on the client device, the product provided for an installation and the installed product include a plurality of physical components, the system comprising:

a processor;

a product matrix including a plurality of software products and logical groupings included into each software product, wherein a respective logical grouping includes a plurality of physical components combined together based on a common attribute, and wherein the logical grouping corresponds to an intermediate abstraction level between a level corresponding to a physical component and a level corresponding to a software product;

a matrix of installed products including at least one software product installed on the client device and logical groupings included into the at least one software product; and a physical configuration module adapted to electronically determine whether the product matrix is the most up-to-date product matrix and to electronically provide the most up-to-date matrix and the matrix of installed products to a version management module;

the version management module adapted to electronically determine which products are installed on the client device, to electronically determine which logical groupings are included in each installed product, to electronically determine which logical groupings are included in the product provided for an installation, to electronically determine whether any of the logical groupings included in the product provided for the installation is incompatible with any of the logical groupings of the installed software product, in response to electronically determining that a second logical grouping included in the product provided for the installation is incompatible with a first logical grouping of the installed software product, to electronically determine if alternate versions of the second logical grouping included in the product provided for the installation are compatible with the first logical grouping of the installed software product, and to electronically determine compatibility results for the product provided for installation and the installed software product to allow an installation action to be performed.

11. The system of claim 10, further comprising:
a compatibility matrix indicating whether any of the two logical groupings are compatible.

12. The system of claim 10, further comprising:
an installation module adapted to electronically receive the compatibility results and electronically perform an action in response to the compatibility results.

13. The system of claim 12, wherein the installation module is further adapted to electronically install the product, responsive to the determination that none of the logical groupings included in the product provided for the installation are incompatible with the logical groupings of the installed product.

14. The system of claim 12, wherein the installation module is further adapted to electronically suspend the installation, responsive to the determination that at least one of the logical groupings included in the product provided for the installation is incompatible with a logical grouping of the installed product.

15. A computer program product comprising:
a computer-readable medium having computer program code embodied therein for enabling determination of whether a first software product is compatible with a second software product, each software product includes a plurality of physical components, the computer program code adapted to:
combine the physical components of the first software product into a first logical grouping based on a first common attribute, wherein the first logical grouping corresponds to an intermediate abstraction level between a level corresponding to a physical component and a level corresponding to a software product;
combine physical components of the second software product into a second logical grouping based on a second common attribute; and
in response to determining that the second logical grouping is not compatible with the first logical grouping based on a corresponding entry of a compatibility matrix, identify an alternate version of the second logical grouping that is compatible with the first logical grouping; and
return information about the alternate version of the second logical grouping to enable an installation action to be performed for the alternate version of the second logical grouping.

16. A method for determining whether a software product provided for an installation on a client device is compatible with a software product installed on the client device, each product provided for an installation and the installed product include a plurality of physical components, the method comprising:
receiving in a computing device a computer readable medium containing the plurality of physical components of the product provided for installation and a compatibility matrix indicating whether a logical grouping of the physical components that are included in the installed product are compatible with a logical grouping of physical components in the product provided for an installation, wherein the logical grouping corresponds to an intermediate abstraction level between a level corresponding to a physical component and a level corresponding to a software product;
using the compatibility matrix to determine whether any of the logical groupings included in the installed product is incompatible with any of the logical groupings included in the product provided for installation;
in response to determining that a second logical grouping included in the product provided for the installation is incompatible with a first logical grouping of the installed software product, using the compatibility matrix to identify an alternate version of the second logical grouping included in the product provided for installation that is compatible with the first logical grouping included in the installed product; and
returning information about the alternate version of the second logical grouping to enable an installation action to be performed for the alternate version of the second logical grouping.

* * * * *